United States Patent
Li et al.

(10) Patent No.: US 11,006,121 B2
(45) Date of Patent: May 11, 2021

(54) LIC SIGNALING METHODS

(71) Applicant: TENCENT AMERICA LLC, Palo Alto, CA (US)

(72) Inventors: Guichun Li, Milpitas, CA (US); Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/894,051

(22) Filed: Jun. 5, 2020

(65) Prior Publication Data

US 2020/0404282 A1 Dec. 24, 2020

Related U.S. Application Data

(60) Provisional application No. 62/864,461, filed on Jun. 20, 2019.

(51) Int. Cl.
| | |
|---|---|
| *H04N 19/136* | (2014.01) |
| *H04N 19/46* | (2014.01) |
| *H04N 19/105* | (2014.01) |
| *H04N 19/176* | (2014.01) |
| *H04N 19/159* | (2014.01) |
| *H04N 19/186* | (2014.01) |
| *H04N 19/132* | (2014.01) |

(52) U.S. Cl.
CPC ......... *H04N 19/136* (2014.11); *H04N 19/105* (2014.11); *H04N 19/132* (2014.11); *H04N 19/159* (2014.11); *H04N 19/176* (2014.11); *H04N 19/186* (2014.11); *H04N 19/46* (2014.11)

(58) Field of Classification Search
None
See application file for complete search history.

(56) References Cited

U.S. PATENT DOCUMENTS

2019/0260996 A1* 8/2019 Zhang ................. H04N 19/593
2019/0320203 A1* 10/2019 Chiang ................ H04N 19/137
(Continued)

OTHER PUBLICATIONS

Jianle Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document: JVET-G1001-v1, Jul. 13-21, 2017, 50 pgs. 7th Meeting: Torino, IT.
(Continued)

*Primary Examiner* — Talha M Nawaz
(74) *Attorney, Agent, or Firm* — Sughrue Mion, PLLC

(57) ABSTRACT

A method may include: receiving information regarding a current data block of an image; determining whether Local Illumination Compensation (LIC) is applicable for the current data block; based on determining that the LIC is applicable for the current data block, at least one of: infering an LIC flag for the current data block to be 1 or true corresponding to the LIC being enabled, or inheriting the current block's LIC flag from an LIC flag of a neighboring block; and based on the LIC flag for the current data block corresponding to the LIC being enabled, generate a prediction of at least one sub-block with a derived motion vector by applying LIC to the current data block using the inherited LIC flag.

20 Claims, 17 Drawing Sheets

(56) References Cited

U.S. PATENT DOCUMENTS

2020/0221078 A1* 7/2020 Seregin ............... H04N 19/167
2020/0351494 A1* 11/2020 Yu ....................... H04N 19/176

OTHER PUBLICATIONS

Huanbang Chen et al., "CE1-related: Combination of LIC and affine", Joint Video Experts Team (JVET) of ITU-T SG 16 WP 3 and ISO/IEC JTC 1/SC 29/WG 11, Document: JVET-N0171-v2, Mar. 19-27, 2019, pp. 1-10, 14th Meeting: Geneva, CH.

Vadim Seregin et al., "CE10-related: Unidirectional illumination compensation", Joint Video Experts Team (JVET) of ITU-T SG 16 WP 3 and ISO/IEC JTC 1/SC 29/WG 11, Document: JVET-M0500-v3, Jan. 9-18, 2019, pp. 1-4, 13th Meeting: Marrakech, MA.

Benjamin Bross et al., "Versatile Video Coding (Draft 4)", Joint Video Experts Team (JVET) of ITU-T SG 16 WP 3 and ISO/IEC JTC 1/SC 29/WG 11, Document: JVET-M1001-v7, Jan. 9-18, 2019, 299 pgs., 13th Meeting: Marrakech, MA.

"High efficiency video coding", International Telecommunication Union, ITU-T, H.265, Dec. 2016, 664 pgs.

* cited by examiner

Encoding System 400

Equation (1) $\left\{\begin{array}{l}mv_x = \dfrac{mv_{1x}-mv_{0x}}{W}x + \dfrac{mv_{1y}-mv_{0y}}{W}y + mv_{0x} \\ mv_y = \dfrac{mv_{1y}-mv_{0y}}{W}x + \dfrac{mv_{1x}-mv_{0x}}{W}y + mv_{0y}\end{array}\right.$

FIG. 5C

Equation (2) $\left\{\begin{array}{l}mv_x = \dfrac{mv_{1x}-mv_{0x}}{W}x + \dfrac{mv_{2x}-mv_{0x}}{H}y + mv_{0x} \\ mv_y = \dfrac{mv_{1y}-mv_{0y}}{W}x + \dfrac{mv_{2y}-mv_{0y}}{H}y + mv_{0y}\end{array}\right.$

FIG. 5D

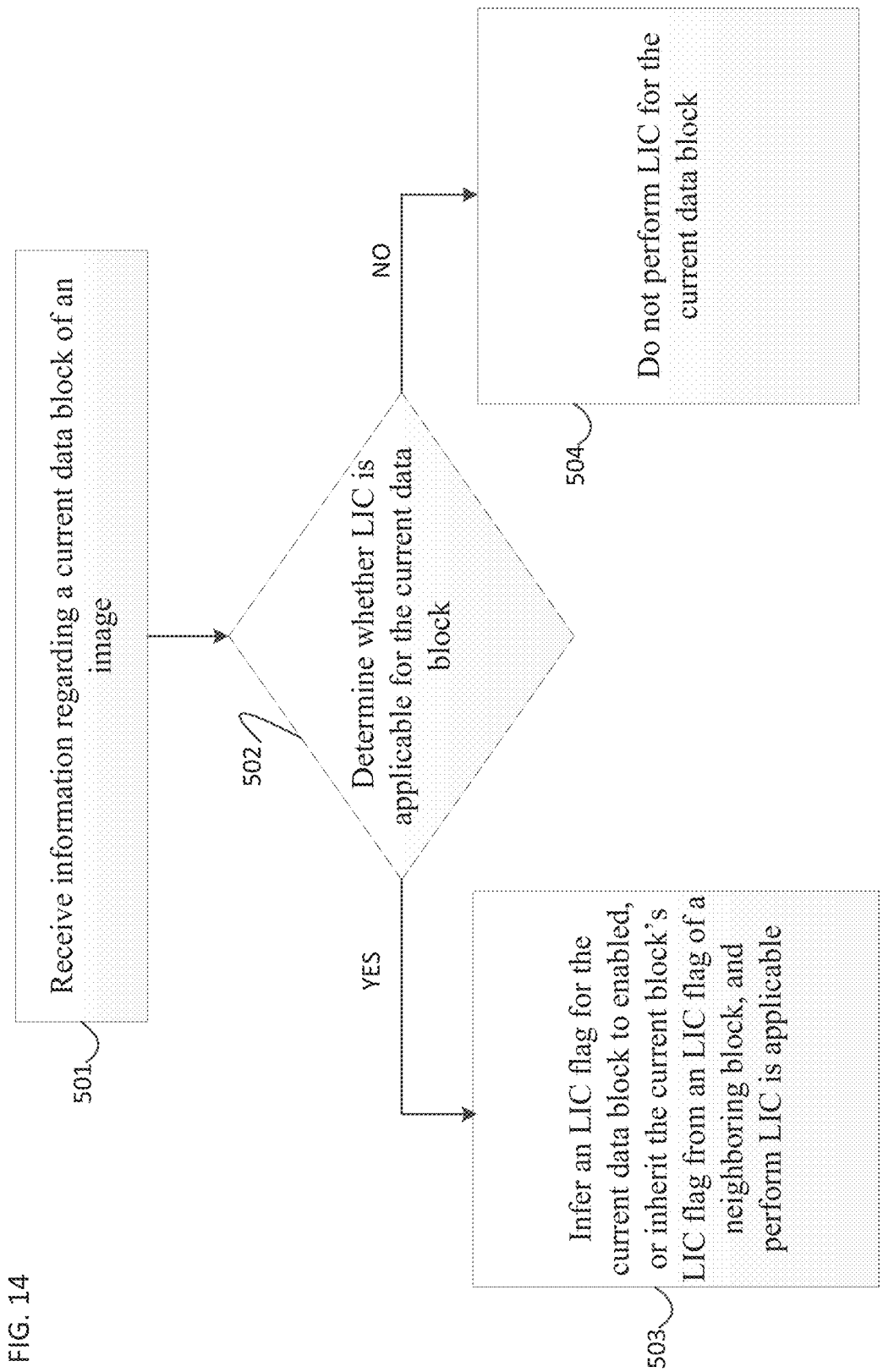

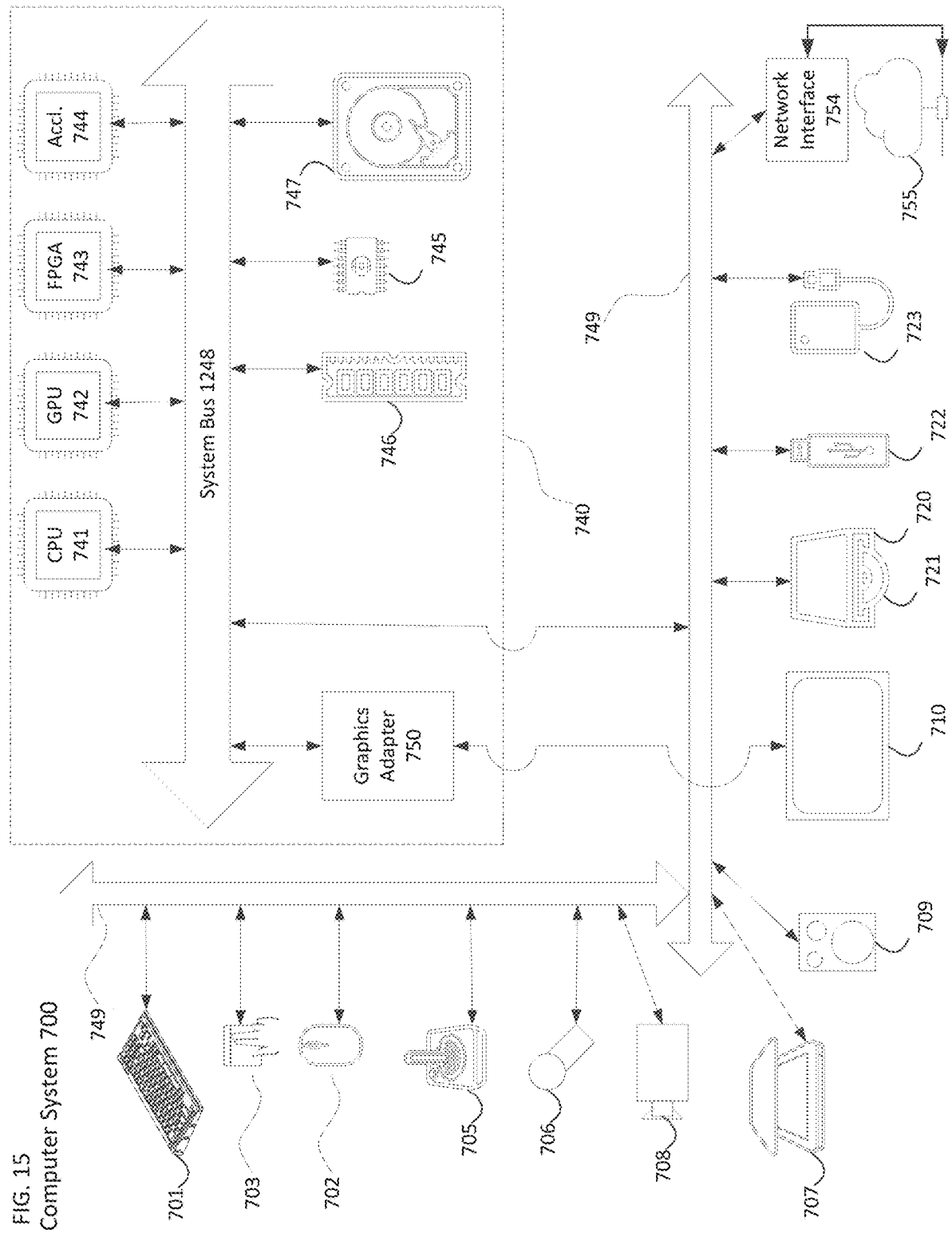

LIC SIGNALING METHODS

PRIORITY INFORMATION

This application claims claims the benefit of priority of U.S. Provisional Application No. 62/864,461, filed on Jun. 20, 2019, in the United States Patent & Trademark Office. The disclosure of U.S. Provisional Application No. 62/864,461 is incorporated herein by reference in its entirety.

BACKGROUND

Field

This disclosure is related to video compression technologies and inter-prediction in advanced video codec. In particular, the disclosure is related to next-generation video coding technologies including video coding/decoding technologies beyond High Efficiency Video Coding (HEVC), such as Versatile Video Coding (VVC). More specifically, an aspect of the disclosure is directed to a method, an apparatus and computer-readable medium that perform Local Illumination Compensation (LIC) and related signaling.

Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 hertz (Hz). Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video may require more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A person of ordinary skill generally understands video compression/decompression technology. In general, to compress video or image data, a series of functional steps are performed to result in a compressed video or image file. Although an image, such as a 360° image (e.g., captured by a 360° camera) may be suitable for compression, for ease of reading, compression of a video file will be explained. To generate a compressed video file, under conventional standards (e.g., H.264, H.265) an uncompressed video sample stream that is received from a video source may be partitioned or parsed, which results in a block of samples of two or more reference pictures.

Bi-Prediction can relate to techniques where a prediction unit (PU), such as a predicted block of samples, can be predicted from two motion compensated blocks of samples of two or more reference pictures. Bi-prediction was first introduced into video coding standards in MPEG-1, and has also been included in other video coding technologies and standards such as MPEG-2 Part 2 (or H.262), H.264 and H.265 as well.

When decompressing a compressed video file, during the reconstruction of a sample of a bi-predicted PU, motion compensated and interpolated input samples from each reference block can be multiplied by a weighting factor that can be different for each reference block, and such weighted sample values of the two reference blocks can be added to generate the sample under reconstruction. Such sample can be processed further by mechanisms such as loop filtering.

In MPEG-1 and MPEG-2, the weighting factors can be determined based on the relative temporal distance between the picture to which the PU under reconstruction belongs to, and the two reference pictures. This is possible because, in MPEG-1 and MPEG-2, one of the two reference I or P pictures was in the "past", and the other in the "future" (in terms of presentation order) of the B-picture under reconstruction, and because in MPEG-1 and MPEG-2, there was a well-defined timing relationship established for any picture under reconstruction in relation to its reference pictures.

Starting with H.264, the reference picture selection concepts for bi-predicted pictures were relaxed such that the reference pictures only needed to be earlier in decoding order, but not in presentation order. Further, the notion of time was also relaxed in that neither H.264 nor H.265 requires a constrained/fixed picture interval in the time domain. Therefore, a decoder cannot calculate weighting factors any more based on the timing information available in the bitstream. Instead, H.264 and H.265 include a "default" of 0.5 as the weighting factor for the reference samples of a bi-predicted picture. This default can be overwritten by syntax available in the slice header known as pred_weight_table( ). The default of 0.5 or the information in the pred_weight_table may apply to all bi-predicted PUs in a given slice.

Non-Patent Literature 1 shows the H.265/HEVC standard. However, a need for standardization of future video coding technology with a compression capability that significantly exceeds that of the HEVC standard (including its extensions) has been studied by the inventors.

Non-Patent Literature 2 discloses a recently launched standardization format for next-generation video coding beyond HEVC called Versatile Video Coding (VVC) with a version VTM (VVC Test Model). VVC may generally provide a large (e.g., 64-point or higher) transform core using a 10-bit integer matrix.

Listing of Related Art

Non-Patent Literature 1: "Transform design for HEVC with 16 bit intermediate data representation"; published by: Joint Collaborative Team on Video Coding (JCT-VC) of ITU-T SG16 WP3 and ISO/IEC JTC1/SC29/WG11, 5th Meeting: Geneva, CH, March 16-23, 2011 (Document: JCTVC-E243). The H.265/HEVC (High Efficiency Video Coding) standard may include Version 1 (2013), Version 2

(2014), Version 3 (2015) and Version 4 (2016) published by ITU-T VCEG (Q6/16) ISO/IEC MPEG (JTC 1/SC 29/WG 11).

Non-Patent Literature 2: "Algorithm description for Versatile Video Coding and Test Model 1 (VTM 1)"; published by Joint Video Experts Team (WET) of ITU-T SG 16 WP 3 and ISO/IEC JTC 1/SC 29/WG 11, 10th Meeting: San Diego, US, April 10-20, 2018 (Document: WET-J1002-v2).

Problem(s) to be Solved

However, when LIC is applied on affine coded blocks, if the current block is coded with constructed affine merge mode, LIC will be enabled if any of the source of the constructed control point has LIC flag set to true. This may not be optimal for coding efficiency.

When the current block is coded in Affine mode with motion vector difference (MVD) coding, the LIC flag is explicitly signaled. This causes additional cost on signaling.

SUMMARY

Provide below is a list of Acryonyms used in this disclosure for explaining embodiments of the disclosure.
AMVP Advanced MVP
CU Coding Unit
CPMV Control Point Motion Vector
HEVC High Efficiency Video Coding
HMVP History-Based MVP
MMVD Merge with MVD
MV Motion Vector
MVD Motion Vector Difference
MVP Motion Vector Predictor
PU Prediction Unit
SbTMVP Subblock-Based TMVP
TMVP Temporal MVP
LIC Local Illumination Compensation
BDOF Bi-Directional Optical Flow
PROF Prediction Refinement with Optical Flow
VTM Versatile Ttest Model
VVC Versatile Video Coding According to an aspect of the disclosure, a method may comprise: receiving information regarding a current data block of an image; determining whether Local Illumination Compensation (LIC) is applicable for the current data block, wherein the determining of whether LIC is applicable for the current block includes determining whether the current data block is coded with affine inter prediction; based on determining that the LIC is applicable for the current data block, at least one of: infering an LIC flag for the current data block to be 1 or true corresponding to the LIC being enabled, or inheriting the current block's LIC flag from an LIC flag of a neighboring block; and based on the LIC flag for the current data block corresponding to the LIC being enabled, generating a prediction of at least one sub-block with a derived motion vector by applying LIC to the current data block using the inherited LIC flag.

The determining of whether the LIC is applicable for the current data block may include: determining whether the current data block is coded with affine inter prediction or regular inter prediction; and based on determining that the current block is coded with affine inter prediction: determining whether any other LIC resrictions apply; and based on determining that no other LIC restrictions apply, infer that the LIC is enabled.

The applying of the LIC to the current data block may include, if the current block is using a constructed affine merge mode, inheriting the current block's LIC flag from the LIC flag of the neighboring block.

The neighboring block may be used to predict a control point motion vector of a corner of the current data block.

The predicted control point motion vector of the corner of the current data block may be a predicted control point motion vector of a top-left corner of the current data block.

The applying the LIC to the current data block may include: applying LIC for an affine data block based on a linear model for illumination changes, using a scaling factor and an offset based on the derived motion vector, and, for each prediction direction, deriving the scaling factor and the offset by using at least one neighbouring sample of the current block and at least one corresponding reference sample.

The at least one neighboring sample may include sub-sampled neighbouring samples of the current block and corresponding reference samples identified by motion information of the current block in a reference picture.

The method may further include when the current data block is coded with merge mode, copying the LIC flag from neighbouring blocks, in a way similar to motion information copied in the merge mode; and when the current data block is not coded with merge mode, the LIC flag is signalled for the current data block to indicate whether LIC applies or not.

The applying of the LIC includes using a mean-removed sum of absolute difference (MR-SAD) and a mean-removed sum of absolute Hadamard-transformed difference (MR-SATD) instead of SAD and SATD, for integer pel motion search and fractional pel motion search, respectively.

The applying of the LIC may include uni-directional illumination compensation, and in local illumination compensation, the scaling factor and offset are derived and the LIC is applied on a CU basis.

The other restrictions may include: a sub-block based on TMVP, triangular partition, multi hypothesis intra inter and bi-directional prediction, or bi-directional prediction.

The other restrictions may include: when one or more of the following conditions apply: (A) when the number of samples in the current block is below a certain minimum threshold; (B) when the number of samples in the current block is above a certain maximum threshold; (C) when the number of samples on either side of the current block is below a side minimum threshold; or (D) when the number of samples in either side of the current block is above a certain maximum threshold.

The certain minimum threshold, certain maximum threshold, the certain side minimum threshold and the certain maximum threshold may vary based on whether the current data block is an affine inter prediction data block.

According to an embodiment, at least one of: the minimum threshold is set to 64 luma samples, the maximum threshold is set to 4096 luma samples, the side minimum threshold is set to 8 luma samples, or the side maximum threshold is set to 64 luma samples.

The other restrictions may include at least one of: an LIC flag is not stored in the motion vector buffer of the reference picture, or a bi-directional merge candidate, a par-wise average candidate, or a zero motion candidate is used.

The method may further include: when the current data block is coded with affine inter prediction affine merge mode, determining the LIC flag value for the current data block by inheriting the LIC flag of a neighboring block that is used as a source of affine model inheritance, which is signalled in the bitstream to indicate whether affine AMVP mode is used, and another flag signals to indicate whether 4-parameter affine or 6-parameter affine is used, and use a first equation when 4-parameter affine is used, and use a second equation when 6 parameter affine is used.

According to an embodiment, the inferred LIC flag may be enabled for either affine AMVP mode or AMVP mode for regular inter prediction, but not for both.

The method may further comprise: applying affine merge mode for CUs with both width and height larger than or equal to a threshold, and selecting only a first inherited candidate from each side, and when a neighboring affine CU is identified, control point motion vectors of the neighboring affine CU are used to derive the CPMVP candidate in the affine merge list of the current CU.

According to an embodiment, an apparatus may comprise: at least one memory configured to store computer program code; and at least one processor configured to access the at least one memory and operate according to the computer program code, the computer program code comprising: first applying code configured to cause the at least one processor to receive information regarding a current data block of an image; second applying code configured to cause the at least one processor to determine whether Local Illumination Compensation (LIC) is applicable for the current data block, wherein the determining of whether LIC is applicable for the current block includes determining whether the current data block is coded with affine inter prediction; third applying code configured to cause the at least one processor to, based on determining that the LIC is applicable for the current data block, at least one of: infer an LIC flag for the current data block to be 1 or true corresponding to the LIC being enabled, or inherit the current block's LIC flag from an LIC flag of a neighboring block; and fourth applying code configured to cause the at least one processor to, based on the LIC flag for the current data block corresponding to the LIC being enabled, generate a prediction of at least one sub-block with a derived motion vector by applying LIC to the current data block using the inherited LIC flag.

According to an embodiment, a non-transitory computer-readable storage medium may store instructions that cause one or more processors to: receive information regarding a current data block of an image; determine whether Local Illumination Compensation (LIC) is applicable for the current data block, wherein the determining of whether LIC is applicable for the current block includes determining whether the current data block is coded with affine inter prediction; based on determining that the LIC is applicable for the current data block, at least one of: infer an LIC flag for the current data block to be 1 or true corresponding to the LIC being enabled, or inherit the current block's LIC flag from an LIC flag of a neighboring block; and based on the LIC flag for the current data block corresponding to the LIC being enabled, generate a prediction of at least one sub-block with a derived motion vector by applying LIC to the current data block using the inherited LIC flag.

BRIEF DESCRIPTION OF THE DRAWINGS

Further features, the nature, and various advantages of the disclosed subject matter will be more apparent from the following detailed description and the accompanying drawings in which:

FIG. 5C show an Equation (1) for an embodiment of the 4-parameter affine motion model.

FIG. 5D show an Equation (2) for an embodiment of the 6-parameter affine motion model.

FIG. 14 is a schematic illustration of an exemplary method in accordance with an embodiment.

FIG. 15 is a schematic illustration of a computer system in accordance with an embodiment.

DETAILED DESCRIPTION

Figure 1:
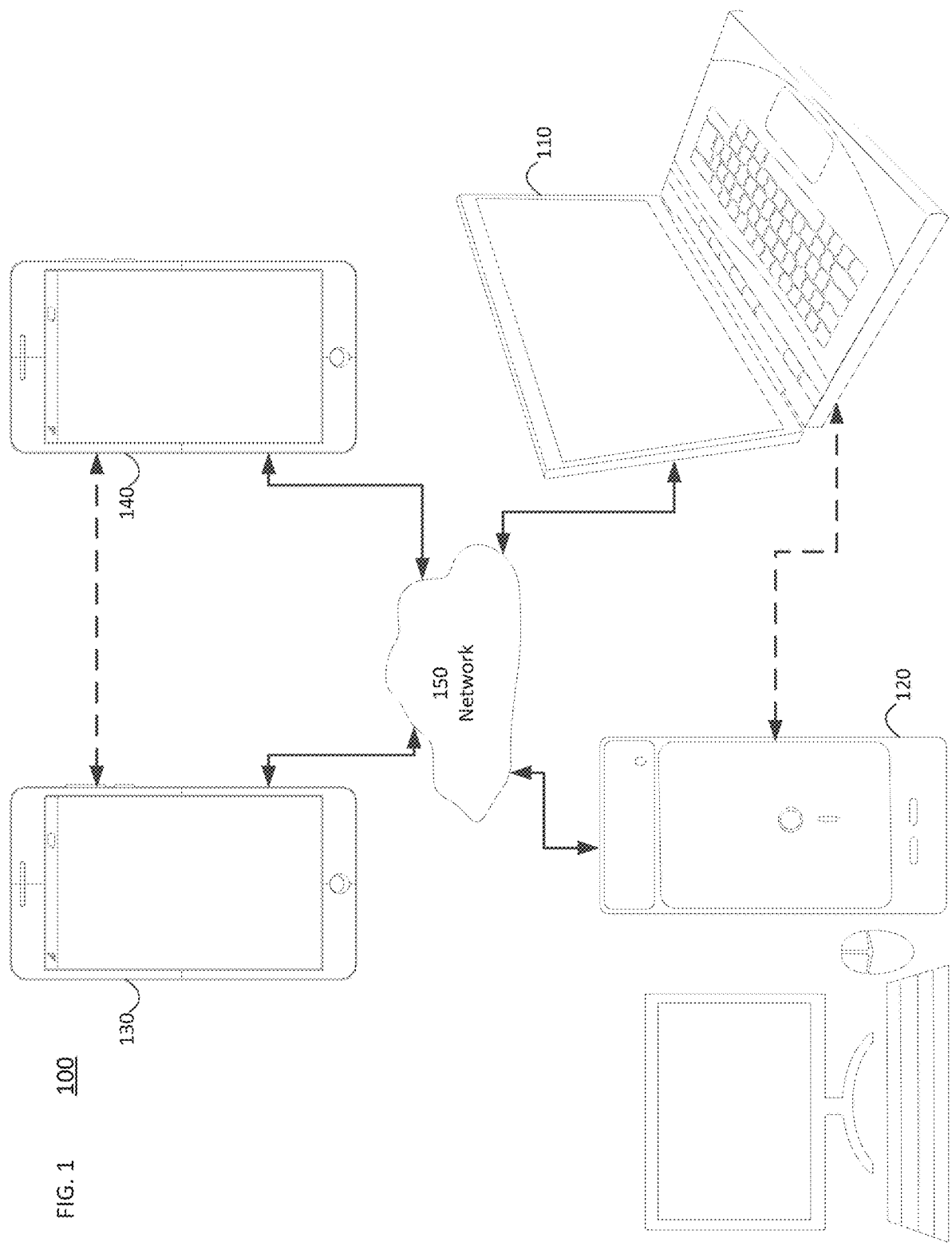
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as a laptop 110, a server 120, and smartphones 130 and 140, but the principles of the present disclosure are not so limited. Embodiments of the present disclosure find application with other equipment including but not limited to laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
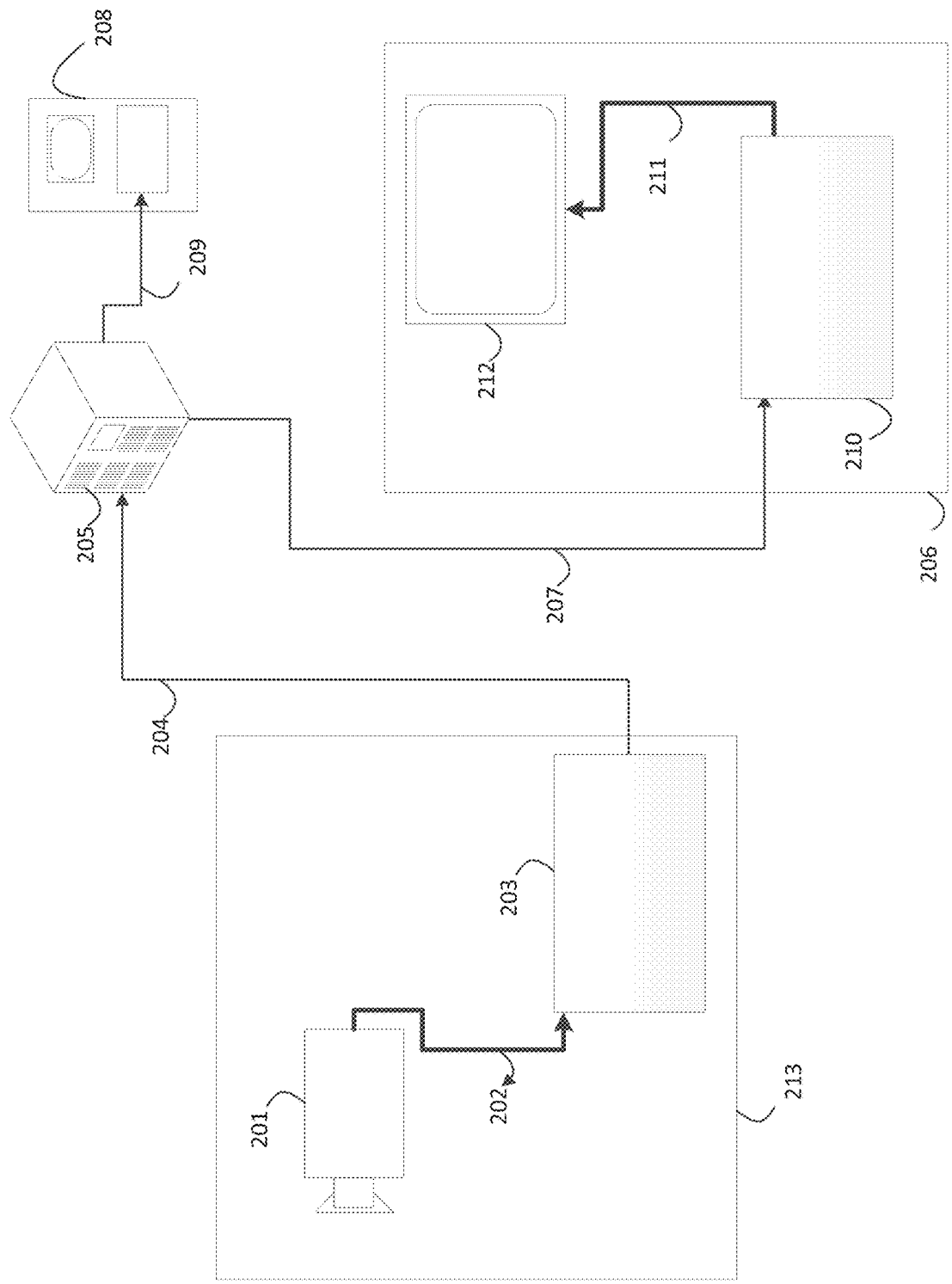
FIG. 2 is a schematic illustration of a simplified block diagram of a streaming system in accordance with an embodiment.

FIG. 2 illustrates, as an example for an application for the disclosed subject matter, the placement of a decoder 210 in a streaming environment/streaming system 200. Decoder 210 is further discussed with reference to FIG. 3 and the decoder 433 in FIG. 4. The decoder 210 may correspond to decoder 210 in FIG. 3 or the decoder 433 in FIG. 4.

The disclosed subject matter can be equally applicable to other video enabled applications, including, for example, video conferencing, digital TV, storing of compressed video on digital media including CD, DVD, memory stick and the like, and so on.

As shown in FIG. 2, a streaming system (200) may include a capture subsystem (213), which can include a video source (201), for example a digital camera, which may create an uncompressed video sample stream (202). That sample stream (202), depicted as a bold line to emphasize a high data volume when compared to encoded video bit streams, can be processed by a source encoder (203) coupled to the camera (201). The source encoder (203) can include hardware (e.g., a processor or circuit and memory), software, or a combination thereof to enable or implement aspects of the disclosed subject matter as described in more detail below. The encoded video bit stream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which may decode the incoming copy of the encoded video bitstream (207) and may create an outgoing video sample stream (211) that can be rendered on a display (212) or other rendering device.

Figure 3:
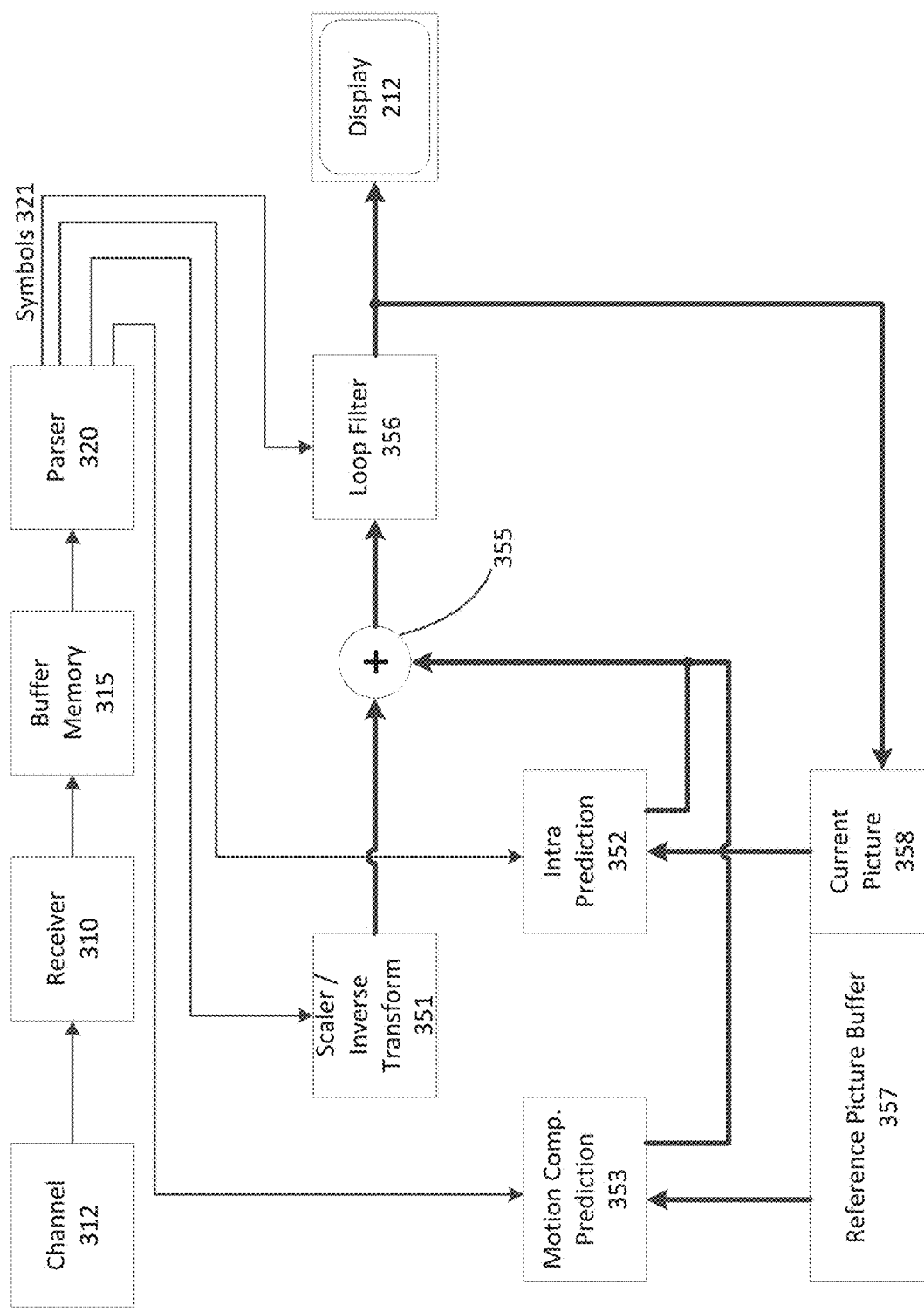
FIG. 3 is a schematic illustration of a simplified block diagram of a decoder in accordance with an embodiment.

FIG. 3 illustrates a functional block diagram of a decoder (210) (e.g., a video decoder) according to an embodiment of the present disclosure. As shown in FIG. 3, a receiver (310) may receive one or more codec video sequences to be decoded by the decoder (210). In the same or another embodiment, one coded video sequence may be received at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between a receiver (310) and an entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, which can be comparatively large and can advantageously be of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as shown in FIGS. 2 and 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser 320 may also extract from the coded video sequence information such as transform coefficients, quantizer parameter values, motion vectors, and so forth.

The parser (320) may perform entropy decoding/parsing operation on the video sequence received from the buffer (315), so as to create symbols (321). Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit may be the scaler/inverse transform unit (351). The scaler/inverse transform unit (351) may receive a quantized transform coefficient as well as control information, including which transform to use, a block size, a quantization factor, quantization scaling matrices, etc. as symbol(s) (321) from the parser (320). It can output blocks comprising sample values that can be input into an aggregator (355).

In some cases, the output samples of the scaler/inverse transform (351) can pertain to an intra-coded block, which is a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter-coded block, and a potentially motion compensated block. In such a case, a Motion Compensation Prediction unit (353) can access reference a picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), and/or maximum reference picture size. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
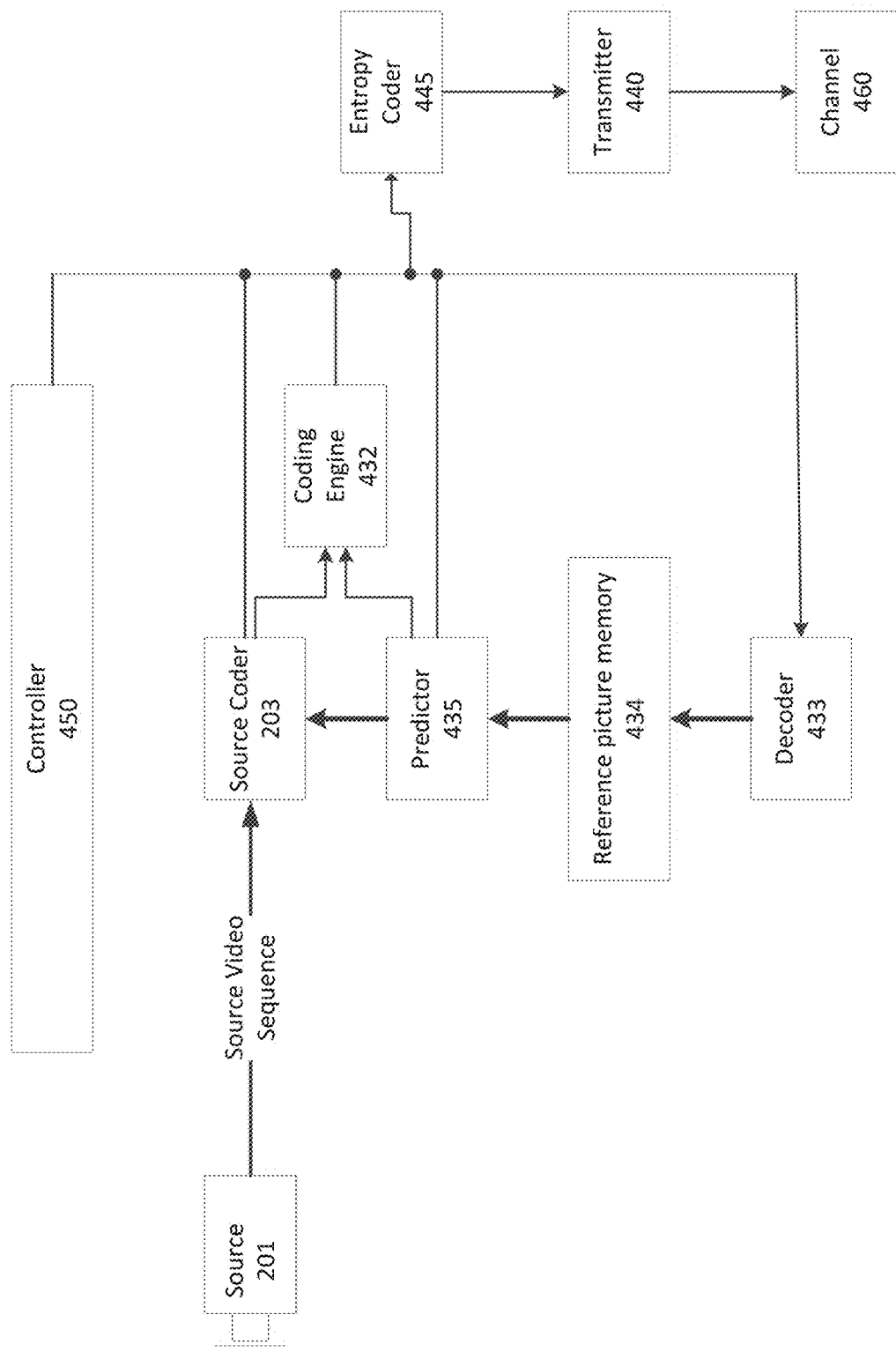
FIG. 4 is a schematic illustration of a simplified block diagram of an encoding system including an encoder and a local decoder in accordance with an embodiment.

FIG. 4 may be a functional block diagram of an encoding system (400) including a source coder (203), which may be a video encoder (203) according to an embodiment of the present disclosure.

The encoder (203) may receive video samples from a video source (201) (that is not a part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device, which may include a memory and a processor, that stores previously prepared video. In a videoconferencing system, the video source (201) may include a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence in real time or under any other time constraints as required by the application. Enforcing appropriate coding speed is one function of controller (450). The controller 450 may control other functional units as described below and is functionally coupled to these units. The coupling is not depicted for clarity. Parameters set by the controller 450 can include rate control related parameters (e.g., picture skip, quantizer, lambda value of rate-distortion optimization techniques), a picture size, a group of pictures (GOP) layout, a maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an oversimplified description, a coding loop can consist of the encoding part of a source encoder (430) ("source coder" or "source encoder" henceforth), which is responsible for creating symbols based on an input picture to be coded, and a reference picture(s), and a local decoder (433) embedded in the encoder (203) that reconstructs the symbols to create the sample data a remote decoder 210 also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of a decoder location (local or remote), the reference picture buffer content is also bit exact between local encoder and remote encoder. In other words, the prediction part of an encoder "sees," as reference picture samples, exactly the same sample values as a decoder would "see" when using prediction during decoding. This fundamental principle of reference picture synchronicity (and resulting drift, if synchronicity cannot be maintained, for example, because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210) (including channel (312), receiver (310), buffer (315), and parser (320)) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies are the inverse of the described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the source encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450), which may include a processor, may manage coding operations of the source coder (203), including, for example, setting of parameters and subgroup parameters used for encoding the video data.

Output of all aforementioned functional units may be subjected to entropy coding in the entropy coder (445). The entropy coder may translate the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the source coder (203) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types from among, for example, an Intra Picture (I picture), a Predictive picture (P picture) and a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The source coder (203) may perform coding operations according to a predetermined video coding technology or standard, such as ITU-T Rec. H.265, or VVC. In its operation, the source coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

As discussed above, the coding of the coded video sequence can be in accordance with a video coding technology or standard, and can follow principles well known to a person skilled in the art, including variable length coding, Huffman coding, arithmetic coding with or without context sensitivity, and so forth. In some streaming systems, the video bitstreams (204, 207, 209) can be encoded according to certain video coding/compression standards. An example of those standards include ITU-T HEVC Recommendation of H.265.

Inter Prediction in VVC

For each inter-predicted CU, motion parameters comprising motion vectors, reference picture indices and reference picture list usage index, and additional information are needed for the new coding feature of VVC to be used for inter-predicted sample generation. The motion parameters can be signaled in an explicit or implicit manner. When a CU is coded with a skip mode, the CU may be associated with one PU and may have no significant residual coefficients, no coded motion vector delta nor a reference picture index. A merge mode may be specified whereby the motion parameters for the current CU are obtained from neighboring CUs, including spatial and temporal candidates, and additional schedules introduced in VVC. The merge mode may be applied to any inter-predicted CU, not just for skip mode. An alternative to merge mode is the explicit transmission of motion parameters, where motion vector, corresponding reference picture index for each reference picture list and reference picture list usage flag and other needed information are signaled explicitly per each CU.

Beyond the inter coding features in HEVC, the VTM3 includes a number of new and refined inter prediction coding tools listed as follows:
Extended merge prediction
Merge mode with MVD (MMVD)
Affine motion compensated prediction
Subblock-based temporal motion vector prediction (SbTMVP)
Triangle partition prediction
Combined inter and intra prediction (CIIP)

The following text provide details about affine inter predictions and related methods.

1.1.1. Affine Motion Compensated Prediction

Figure 5B:
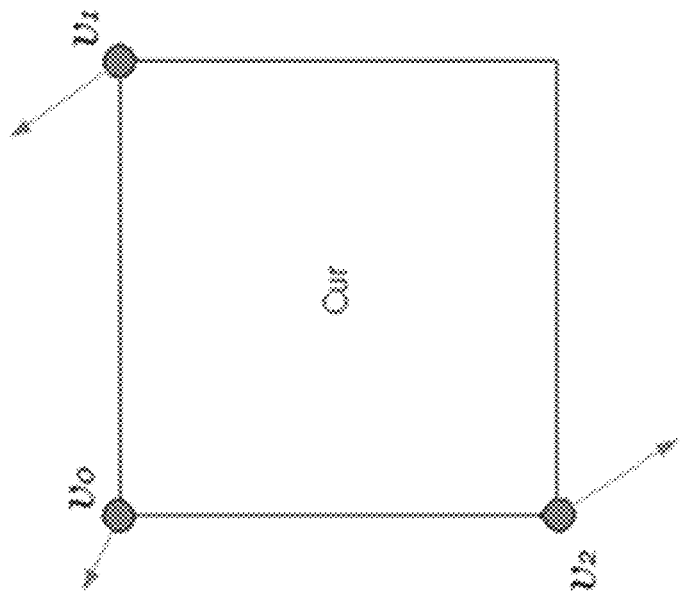
FIGS. 5A and 5B show the affine motion field of a block according to an embodiment may be described by motion information of two control point (4-parameter in FIG. 5A) or three control point motion vectors (6-parameter in FIG. 5B).
Figure 5A:
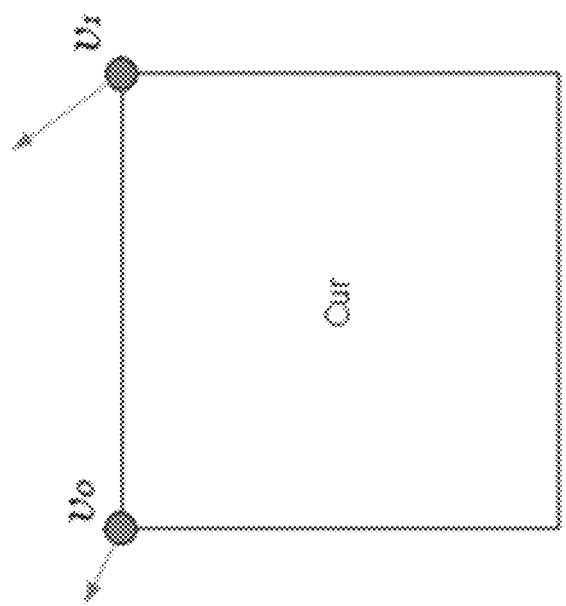

In HEVC, only a translation motion model is applied for motion compensation prediction (MCP). However, in the real world, there are many kinds of motion (e.g., zoom in/out, rotation, perspective motions and other irregular motions). In current VTM, a block-based affine transform motion compensation prediction may be applied. As shown in FIGS. 5A and 5B, the affine motion field of the block may be described by motion information of two control point (4-parameter in FIG. 5A) or three control point motion vectors (6-parameter in FIG. 5B).

FIG. 5A shows a 4-parameter control point based affine model and FIG. 5B shows a 6-parameter control point passed affine model. For the 4-parameter affine motion model, a motion vector at a sample location (x, y) in a block may be derived based on Equation (1) shown in FIG. 5C.

For the 6-parameter affine motion model, a motion vector at a sample location (x, y) in a block may be derived based on Equation (2) in FIG. 5D.

For Equations (1) and (2), $(mv_{0x}, mv_{0y})$ may be a motion vector of the top-left corner control point, $(mv_{1x}, mv_{1y})$ may be a motion vector of the top-right corner control point, and $(mv_{2x}, mv_{2y})$ may be a motion vector of the bottom-left corner control point.

In order to simplify the motion compensation prediction, according to an embodiment, block based affine transform prediction may be applied.

Figure 6:
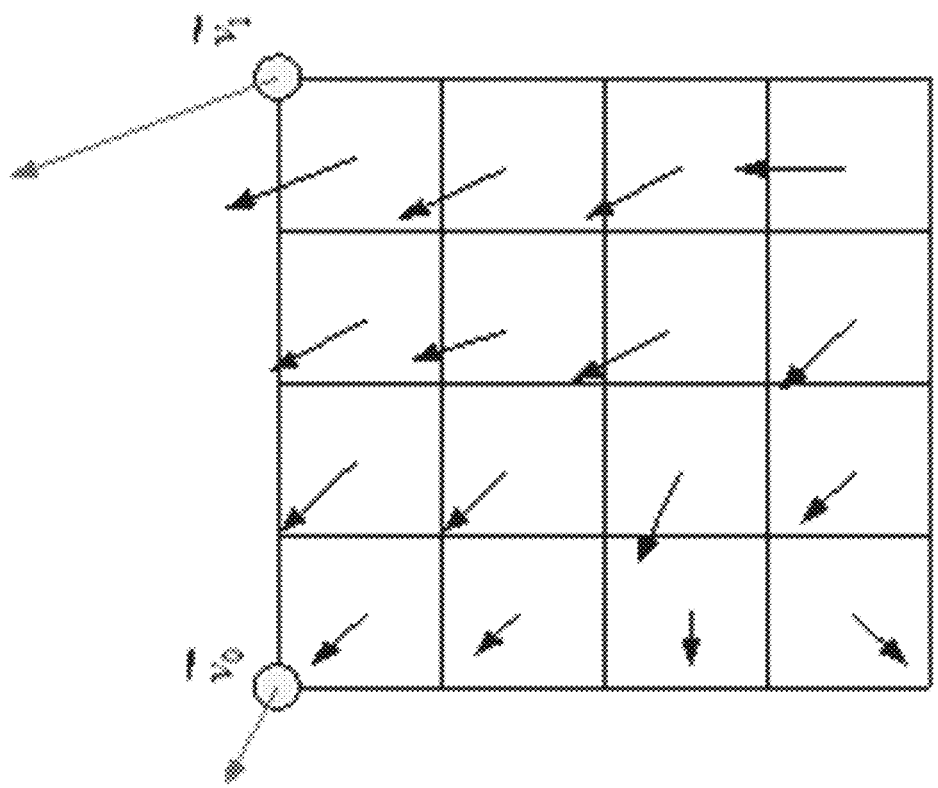
FIG. 6 shows an Affine MVF (MV field) for each sub-block, according to an embodiment.

FIG. 6 shows an Affine MVF (MV field) for each sub-block. According to an embodiment, to derive a motion vector of each 4×4 luma sub-block, the motion vector of a center sample of each sub-block, as shown in FIG. 6, may be calculated according to at least of the above Equations (1) and (2), and rounded (e.g., rounded to 1/16 fraction accuracy). Subsequently, the motion compensation interpolation filters may be applied to generate the prediction of each sub-block with a derived motion vector. According to an embodiment, the sub-block size of chroma-components may also be set to be 4×4. According to an embodiment, the MV of a 4×4 chroma sub-block may be calculated as the average of the MVs of the four corresponding 4×4 luma sub-blocks.

As done for translational motion inter prediction, there are also two affine motion inter prediction modes: affine merge mode and affine AMVP mode.

Affine Merge Prediction Modes

Figure 7:
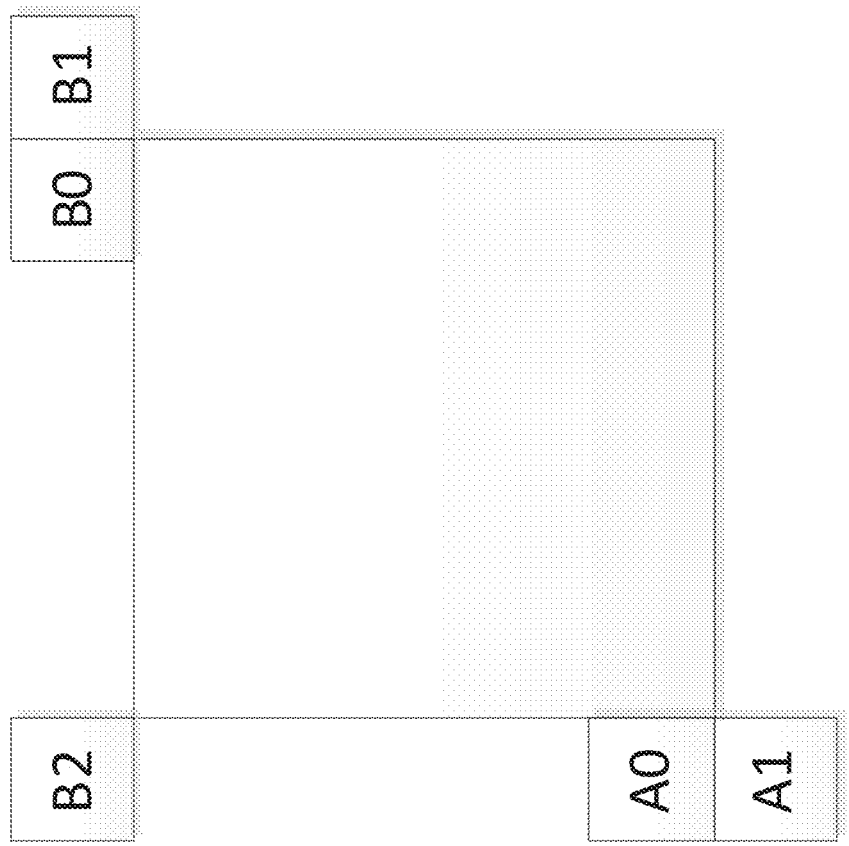
FIG. 7 shows positions of spatial merge candidate blocks according to an embodiment.

AF_MERGE mode can be applied for CUs with both width and height larger than or equal to 8. In AF_MERGE mode, the CPMVs of the current CU may be generated based on the motion information of the spatial neighboring CUs. According to an embodiment, there can be up to five CPMVP candidates and an index may be signalled to indicate the one to be used for the current CU. The following three types of CPVM candidates may be used to form the affine merge candidate list:

1) Inherited affine merge candidates that are extrapolated from the CPMVs of the neighbour CUs;
2) Constructed affine merge candidates that are extrapolated from CPMVPs that are derived using the translational MVs of the neighbour CUs; and
3) Zero MVs FIG. 7 shows positions of spatial merge candidate blocks according to an embodiment.

In VTM3, according to an embodiment, there are a maximum of two inherited affine candidates, which are derived from affine motion model of the neighboring blocks, one from left neighboring CUs and one from above neighboring CUs. For the left predictor, the scan order may be A0->A1, and for the above predictor, the scan order may be B0->B1->B2. According to an embodiment, only the first inherited candidate from each side may be selected. No pruning check is performed between two inherited candidates. When a neighboring affine CU is identified, its control point motion vectors may be used to derive the CPMVP candidate in the affine merge list of the current CU.

Figure 8:
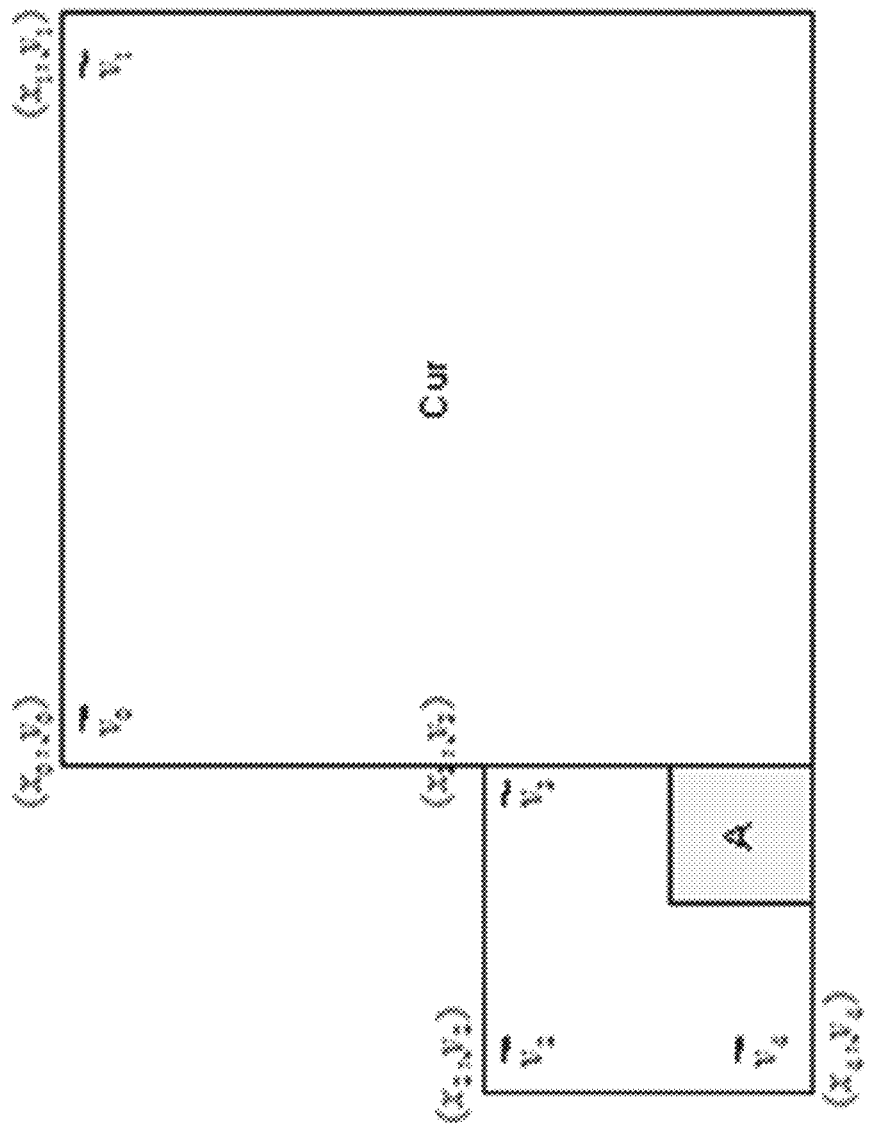
FIG. 8 shows control point motion vector inheritance according to an embodiment.

FIG. 8 shows control point motion vector inheritance. As shown in FIG. 8, according to an embodiment, if the neighbour left bottom block A is coded in affine mode, the motion vectors $v_2$, $v_3$ and $v_4$ of the top left corner, above right corner and left bottom corner, respectively, of the CU which contains the block A may be attained. When block A is coded with a 4-parameter affine model, the two CPMVs of the current CU may be calculated according to $v_2$, and $v_3$. In a case that block A is coded with a 6-parameter affine model, the three CPMVs of the current CU may be calculated according to $v_2$, $v_3$ and $v_4$.

Figure 9:
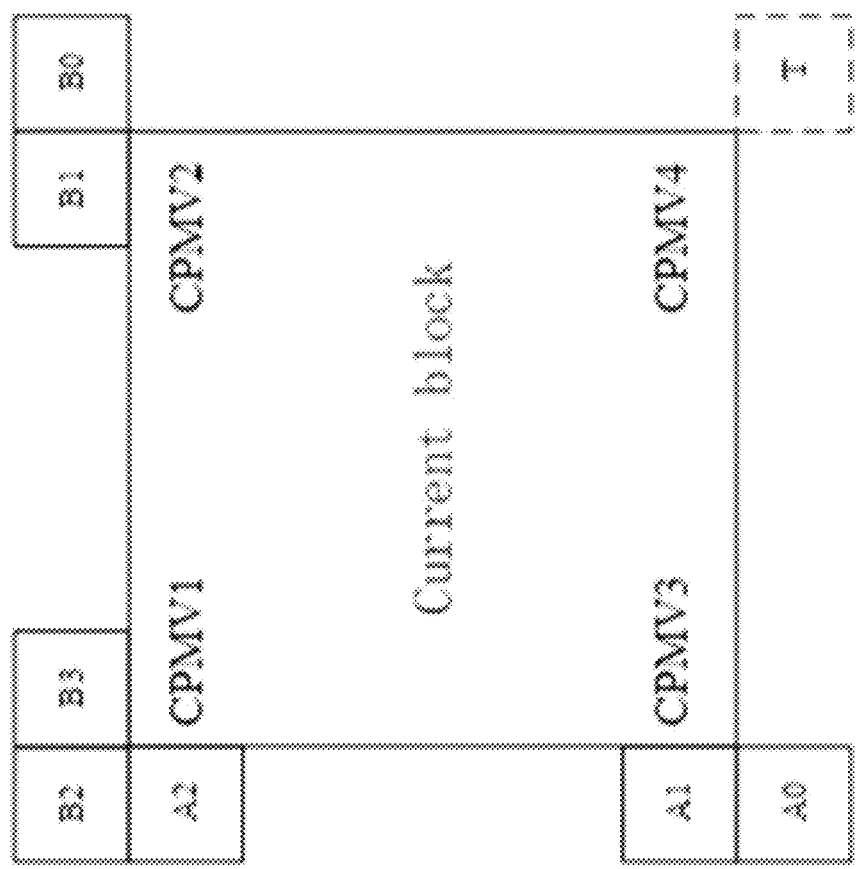
FIG. 9 shows Locations of Candidates positions for constructed affine merge mode according to an embodiment.

FIG. 9 shows Locations of Candidates positions for constructed affine merge mode. According to an embodiment, a constructed affine candidate means the candidate is constructed by combining the neighbor translational motion information of each control point. The motion information for the control points may be derived from the specified spatial neighbors and temporal neighbor shown in FIG. 9.

As shown in FIG. 9, $CPMV_k$ (k=1, 2, 3, 4) may represent the k-th control point. For $CPMV_1$, the B2->B3->A2 blocks may be checked and the MV of the first available block may be used. For $CPMV_2$, the B1->B0 blocks may be checked and for $CPMV_3$, the A1->A0 blocks may be checked. According to an embodiment, TMVP may be used as $CPMV_4$ if it's available.

According to an embodiment, after MVs of four control points are attained, affine merge candidates may be constructed based on that motion information. The following combinations of control point MVs may be used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}.

The combination of 3 CPMVs may be used to construct a 6-parameter affine merge candidate and the combination of 2 CPMVs may be used to construct a 4-parameter affine merge candidate. According to an embodiment, to avoid motion scaling process, if the reference indices of control points are different, the related combination of control point MVs may be discarded.

After inherited affine merge candidates and constructed affine merge candidate are checked, if the list is still not full, zero MVs may be inserted to the end of the list, according to an embodiment.

Affine AMVP Prediction

Affine AMVP mode can be applied for CUs with both width and height larger than or equal to 16. According to an embodiment, an affine flag in CU level may be signalled in the bitstream to indicate whether affine AMVP mode is used and then another flag may be signaled to indicate whether 4-parameter affine or 6-parameter affine is used. In Affine AMVP mode, the difference of the CPMVs of current CU and their predictors CPMVPs may be signalled in the bitstream. The affine AVMP candidate list size may be 2 and it may be generated by using the following four types of CPVM candidate in order:
1) Inherited affine AMVP candidates that extrapolated from the CPMVs of the neighbour CUs;
2) Constructed affine AMVP candidates CPMVPs that are derived using the translational MVs of the neighbour CUs;
3) Translational MVs from neighboring CUs;
4) Zero MVs.

According to an embodiment, after inherited affine merge candidates and constructed affine merge candidate are checked, if the list is still not full, zero MVs are inserted to the end of the list.

The checking order of inherited affine AMVP candidates may be the same or similar to the checking order of inherited affine merge candidates. According to an embodiment, the only difference may be that, for AVMP candidate, only the affine CU that has the same reference picture as in current block is considered. According to an embodiment, no pruning process is applied when inserting an inherited affine motion predictor into the candidate list.

According to an embodiment, a constructed AMVP candidate may be derived from the specified spatial neighbors shown in FIG. 9. The same checking order may be used as done in affine merge candidate construction. In addition, a reference picture index of the neighboring block may also be checked. The first block in the checking order that is inter coded and has the same reference picture as in current CUs may be used. According to an embodiment, there may be only one. When the current CU is coded with 4-parameter affine mode, and $mv_0$ and $mv_1$ are both available, they both may be added as one candidate in the affine AMVP list. When the current CU is coded with 6-parameter affine mode, and all three CPMVs are available, all three may be added as one candidate in the affine AMVP list. Otherwise, constructed AMVP candidate may be set as unavailable.

If affine AMVP list candidates is still less than 2 after inherited affine AMVP candidates and Constructed AMVP candidate are checked, $mv_0$, $mv_1$ and $mv_2$ may be be added, in order, as the translational MVs to predict all control point MVs of the current CU, when available. Finally, zero MVs may be used to fill the affine AMVP list, if it is still not full.

Local Illumination Compensation (LIC)

A method of Local Illumination Compensation (LIC) is based on a linear model for illumination changes, using a scaling factor a and an offset b. And LIC may be enabled or disabled adaptively for each inter-mode coded coding unit (CU).

Figure 10:
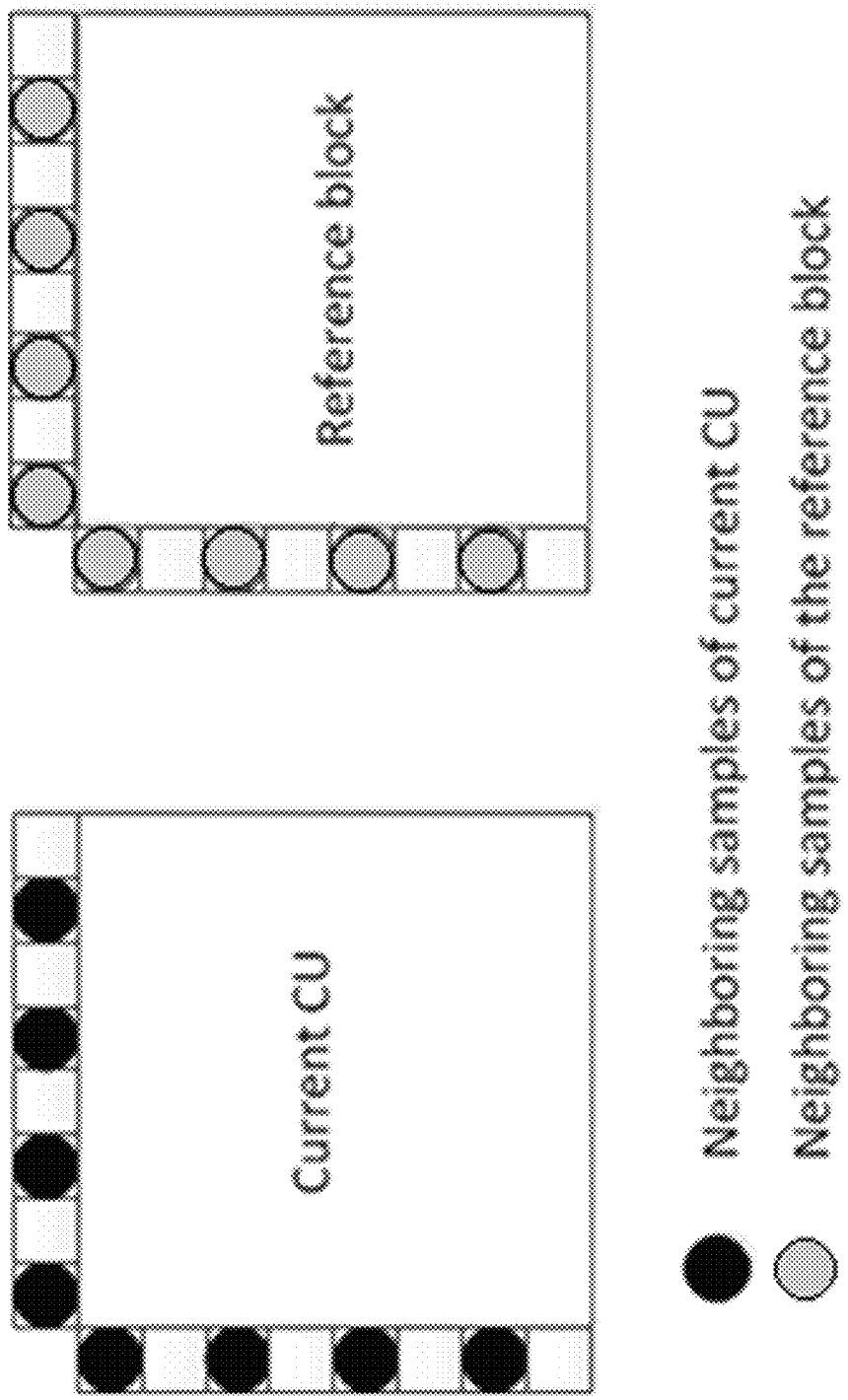
FIG. 10 shows neighbouring samples that may be used for deriving IC parameters, according to an embodiment.

FIG. 10 shows neighbouring samples that may be used for deriving IC parameters, according to an embodiment.

As shown in FIG. 10, when LIC applies for a CU, a least square error method may be employed to derive the parameters a and b by using the neighbouring samples of the current CU and their corresponding reference samples. More specifically, as illustrated in FIG. 10, the subsampled (2:1 subsampling) neighbouring samples of the CU and the corresponding reference samples (identified by motion information of the current CU or sub-CU) in the reference picture are used. The IC parameters may be derived and applied for each prediction direction separately.

When a CU is coded with merge mode, the LIC flag may be copied from neighbouring blocks, in a way similar to motion information copied in merge mode; otherwise, an LIC flag may be signalled for the CU to indicate whether LIC applies or not.

When LIC is enabled for a picture, additional CU level RD check may be needed to determine whether LIC is applied or not for a CU. When LIC is enabled for a CU, mean-removed sum of absolute difference (MR-SAD) and mean-removed sum of absolute Hadamard-transformed difference (MR-SATD) may be used, instead of SAD and SATD, for integer pel motion search and fractional pel motion search, respectively.

Unidirectional illumination compensation

A modified method of LIC may include uni-directional illumination compensation. In local illumination compensation, the linear model parameters derivation may be kept unchanged and the LIC may be applied on a CU basis. According to an embodiment, the proposed LIC is not applied to sub-block based inter prediction, such as ATMVP or affine, triangular partition, multi hypothesis intra inter and bi-directional prediction.

According to an embodiment, the proposed LIC is not applied to bi-directional prediction, since the reconstructed neighboring samples of the current block are not required to perform inter prediction in the inter pipeline and thus are not available for each uni-directional inter prediction, which otherwise would be required for LIC since the weighted average for bi-prediction is applied after deriving uni-directional predictors. Also, having LIC applied to bi-directional prediction introduces an additional stage due to performing LIC process before the weighting.

Figure 11:
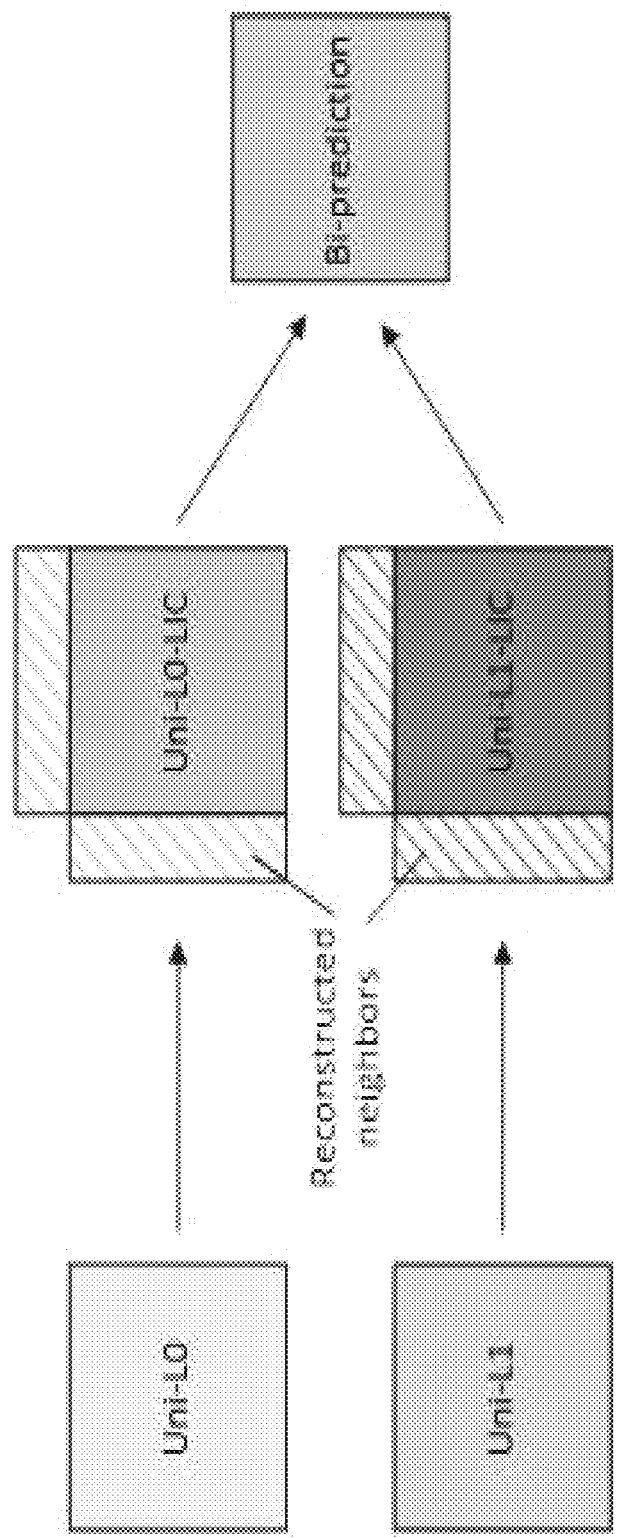
FIG. 11 shows Local Illumination Compensation (LIC) with bi-prediction, according to an embodiment.

FIG. 11 shows LIC with bi-prediction, according to an embodiment.

For the same reasoning, LIC is not applied for the multi hypothesis intra inter because LIC is applied after inter prediction and weighting between intra and inter would be delayed by the LIC process.

Figure 12:
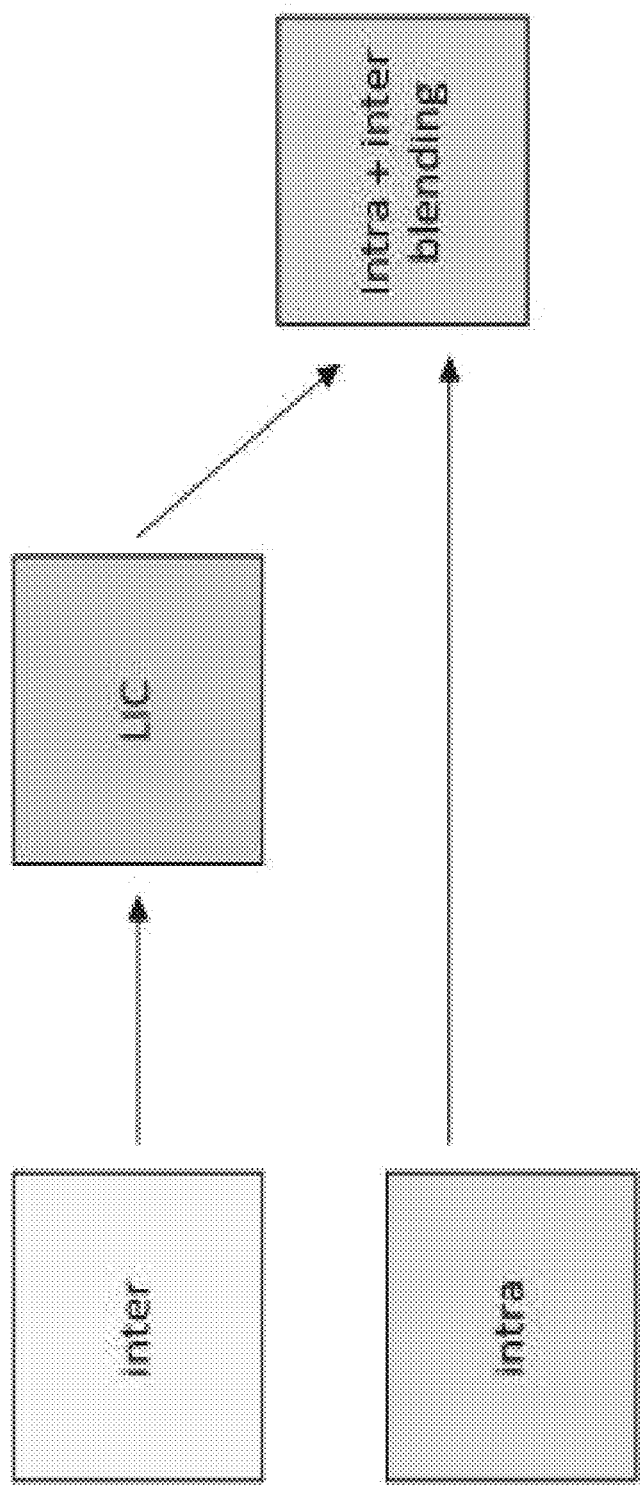
FIG. 12 shows LIC with a multi hypothesis intra inter LIC flag included as a part of motion information in addition to MVs and reference indices, according to an embodiment.

FIG. 12 shows LIC with a multi hypothesis intra inter LIC flag included as a part of motion information in addition to MVs and reference indices, according to an embodiment. However, when a merge candidate list is constructed, an LIC flag may be inherited from the neighbor blocks for merge candidates, but, according to an embodiment, LIC is not used for motion vector pruning for simplification.

According to an embodiment, an LIC flag is not stored in the motion vector buffer of the reference picture, so LIC flag may be set equal to false for TMVP. According to an embodiment, an LIC flag is also set equal to false for bi-directional merge candidates, such as par-wise average candidate, and zero motion candidates. When the LIC tool is not applied, the LIC flag may not be signaled.

Applying LIC for Affine

Figure 13A:
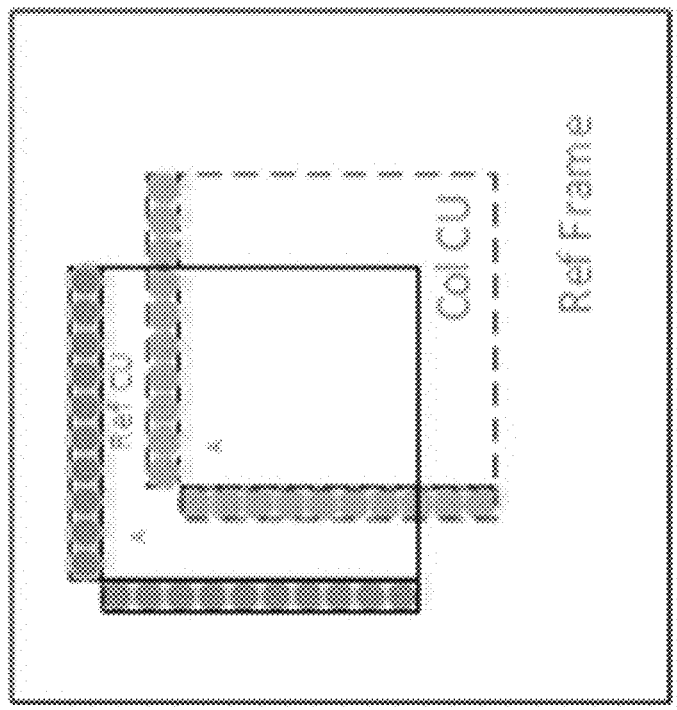
FIG. 13A shows reference samples in a method, according to an embodiment.
Figure 13A:
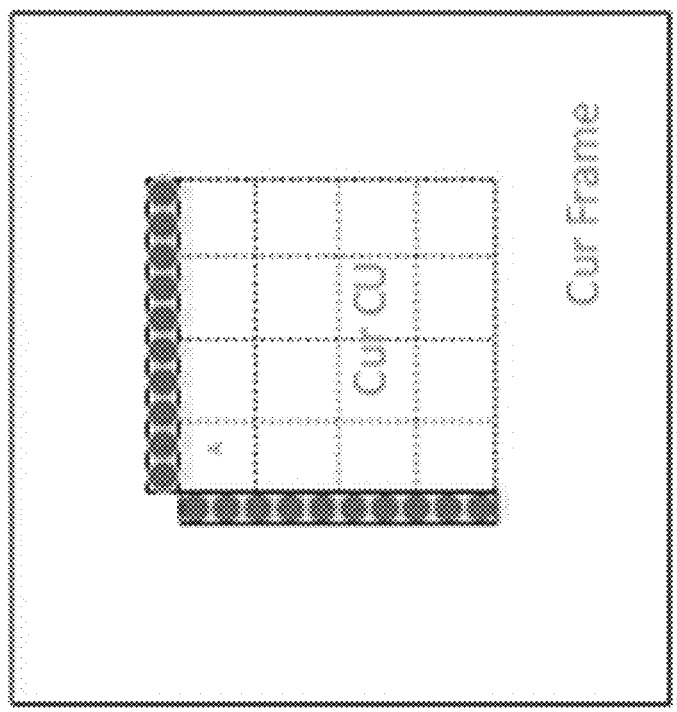

FIG. 13A shows reference samples in method 1 (discussed above), according to an embodiment. The LIC may be extended to affine coded CUs. The derivation of linear model parameters may be kept unchanged and three methods may be used for fetching the reference samples of affine coded CU.

In method one, as shown in FIG. 13A, the top-left sub-block motion vector (MV) of the affine coded CU may be used for fetching the reference samples of the whole CU.

Figure 13B:
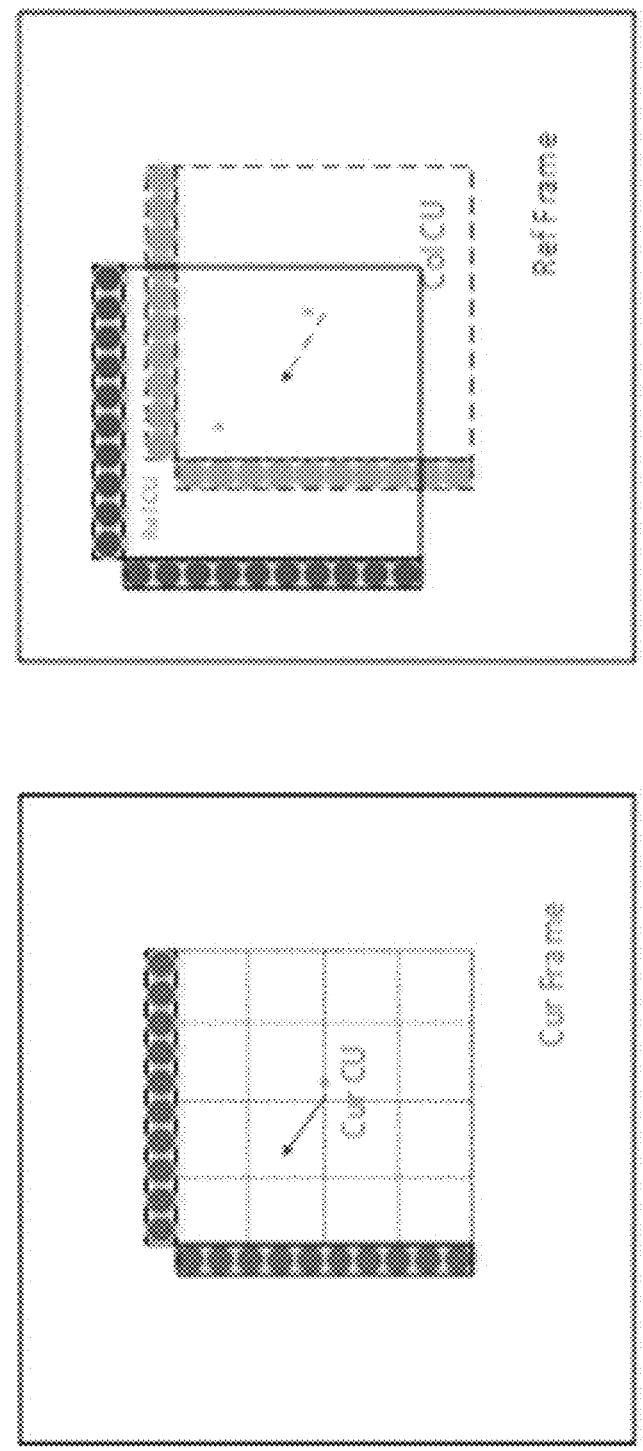
FIG. 13B shows reference samples in a method, according to an embodiment.

FIG. 13B shows reference samples in method 2 (discussed above), according to an embodiment. In method two, as shown in FIG. 13B, the central sub-block MV of the affine coded CU may be used for fetching the reference samples of the whole CU, according to an embodiment.

In method three, as shown in FIG. 15, the reference samples in the top template may be fetched by each sub-block MVs in a top row and the reference samples in the left template may be fetched by each sub-block MVs in a left column.

FIG. 15 shows referen samples in method 3 (discussed above), according to an embodiment.

Embodiments of LIC Applications

When LIC tool is enabled, the following may apply:
5.1.1 In one embodiment, when the current block is coded with affine inter prediction, and it is signaled by affine AMVP mode, the LIC flag for the current block may be inferred to be true, unless LIC is not applicable due to other limitations, for example as described in 5.1.5.
5.1.2 In another embodiment, when the current block is coded in regular inter prediction mode with translational motion vectors, and it is signaled by AMVP mode, the LIC flag for the current block may be inferred to be true, unless LIC is not applicable due to other limitations, for example as described in 5.1.5.
5.1.3 In another embodiment, the inferred LIC flag methods may be enabled for either affine AMVP mode (as described in 5.1.1) or AMVP mode for regular inter prediction (as described in 5.1.2), but not for both.
5.1.4 When the current block is coded in affine merge mode, its LIC flag value for the current block may be determined by one or more of the following:
5.1.4.1 In one embodiment, when the inherited affine merge is used for the current block, the current block's LIC flag may be be inherited from the LIC flag of the neighboring block that is used as a source of affine model inheritance. Unless LIC is not applicable due to other limitations.
5.1.4.2 When the constructed affine merge is used by the current block, the following may apply:
5.1.4.2.1 In one embodiment, if LIC is applicable to the current block, the current block's LIC flag may be inferred to be 1 (enabled). Otherwise, LIC is not applicable to the current block, such as due to the limitations in 5.1.5.
5.1.4.2.2 In another embodiment, if the current block is using constructed affine merge mode, current block's LIC flag may be inferred to be 1 (enabled). If LIC is not applicable to the current block, such as due to the limitation as described in 5.1.5, the current block's LIC may be disabled.
5.1.4.2.3 In another embodiment, if LIC is applicable to the current block, if the current block is using constructed affine merge mode, the current block's LIC flag may be inherited from the LIC flag of the neighboring block that is used to predict the CPMV of the top-left corner of the current block.
5.1.5 Limitations on the application of LIC may be applied by one or any combination of the following:
5.1.5.1 In one embodiment, when the number of samples in the current block is below a certain threshold, LIC may be disabled for the block. In one example, the threshold may be set to 64 luma samples.
5.1.5.2 In another embodiment, when the number of samples in the current block is above a certain threshold, LIC may be disabled for the block. In one example, the threshold may be set to 4096 luma samples.
5.1.5.3 In one embodiment, when the number of samples in either side of the current block is below a certain threshold, LIC may be disabled for the block. In one example, the threshold may be set to 8 luma samples.
5.1.5.4 In another embodiment, when the number of samples in either side of the current block is above a certain threshold, LIC may be disabled for the block. In one example, the threshold may be set to 64 luma samples.
5.1.5.5 In another embodiment, when the current block is coded in bi-prediction mode, LIC may be disabled for the block. Alternatively, when the current block is coded in multi-hypothesis mode, LIC may be disabled for the block.
5.1.5.6 In one embodiment, the same limitations or combinations of limitations may be applied on blocks which are coded in affine inter prediction mode and blocks which are coded in regular translational inter prediction mode.

5.1.5.7 In another embodiment, different limitations or combinations of limitations may be applied on blocks which are coded in affine inter prediction mode and blocks which are coded in regular translational inter prediction mode.

Referring to FIG. 14, in a first, simple example, according to an aspect of the disclosure, a method may comprise: receiving information regarding a current data block of an image (Operation 501). The method may further comprise: determining whether Local Illumination Compensation (LIC) is applicable for the current data block (Operation 502).

The determining of whether LIC is applicable for the current block includes determining whether the current data block is coded with affine inter prediction.

The method may further comprise, when Operation 502 =Yes, perform Operation 503, which is based on determining that the LIC is applicable for the current data block, at least one of: infering an LIC flag for the current data block to be 1 or true corresponding to the LIC being enabled, or inheriting the current block's LIC flag from an LIC flag of a neighboring block.

Moreover, based on the LIC flag for the current data block corresponding to the LIC being enabled, the method may include generating a prediction of at least one sub-block with a derived motion vector by applying LIC to the current data block using the inherited LIC flag.

If the Operation 502 is No, LIC may be prohibited from being applied.

The determining of whether the LIC is applicable for the current data block may include: determining whether the current data block is coded with affine inter prediction or regular inter prediction; and based on determining that the current block is coded with affine inter prediction: determining whether any other LIC resrictions apply; and based on determining that no other LIC restrictions apply, infer that the LIC is enabled.

The applying of the LIC to the current data block may include, if the current block is using a constructed affine merge mode, inheriting the current block's LIC flag from the LIC flag of the neighboring block.

The neighboring block may be used to predict a control point motion vector of a corner of the current data block.

The predicted control point motion vector of the corner of the current data block may be a predicted control point motion vector of a top-left corner of the current data block.

The applying the LIC to the current data block may include: applying LIC for an affine data block based on a linear model for illumination changes, using a scaling factor and an offset based on the derived motion vector, and, for each prediction direction, deriving the scaling factor and the offset by using at least one neighbouring sample of the current block and at least one corresponding reference sample.

The at least one neighboring sample may include subsampled neighbouring samples of the current block and corresponding reference samples identified by motion information of the current block in a reference picture.

The method may further include when the current data block is coded with merge mode, copying the LIC flag from neighbouring blocks, in a way similar to motion information copied in the merge mode; and when the current data block is not coded with merge mode, the LIC flag is signalled for the current data block to indicate whether LIC applies or not.

The applying of the LIC includes using a mean-removed sum of absolute difference (MR-SAD) and a mean-removed sum of absolute Hadamard-transformed difference (MR-SATD) instead of SAD and SATD, for integer pel motion search and fractional pel motion search, respectively.

The applying of the LIC may include uni-directional illumination compensation, and in local illumination compensation, the scaling factor and offset are derived and the LIC is applied on a CU basis.

The other restrictions may include: a sub-block based on TMVP, triangular partition, multi hypothesis intra inter and bi-directional prediction, or bi-directional prediction.

The other restrictions may include: when one or more of the following conditions apply: (A) when the number of samples in the current block is below a certain minimum threshold; (B) when the number of samples in the current block is above a certain maximum threshold; (C) when the number of samples on either side of the current block is below a side minimum threshold; or (D) when the number of samples in either side of the current block is above a certain maximum threshold.

The certain minimum threshold, certain maximum threshold, the certain side minimum threshold and the certain maximum threshold may vary based on whether the current data block is an affine inter prediction data block.

According to an embodiment, at least one of: the minimum threshold is set to 64 luma samples, the maximum threshold is set to 4096 luma samples, the side minimum threshold is set to 8 luma samples, or the side maximum threshold is set to 64 luma samples.

The other restrictions may include at least one of: an LIC flag is not stored in the motion vector buffer of the reference picture, or a bi-directional merge candidate, a par-wise average candidate, or a zero motion candidate is used.

The method may further include: when the current data block is coded with affine inter prediction affine merge mode, determining the LIC flag value for the current data block by inheriting the LIC flag of a neighboring block that is used as a source of affine model inheritance, which is signalled in the bitstream to indicate whether affine AMVP mode is used, and another flag signals to indicate whether 4-parameter affine or 6-parameter affine is used, and use a first equation when 4-parameter affine is used, and use a second equation when 6 parameter affine is used.

According to an embodiment, the inferred LIC flag may be enabled for either affine AMVP mode or AMVP mode for regular inter prediction, but not for both.

The method may further comprise: applying affine merge mode for CUs with both width and height larger than or equal to a threshold, and selecting only a first inherited candidate from each side, and when a neighboring affine CU is identified, control point motion vectors of the neighboring affine CU are used to derive the CPMVP candidate in the affine merge list of the current CU.

According to an embodiment, an apparatus may comprise: at least one memory configured to store computer program code; and at least one processor configured to access the at least one memory and operate according to the computer program code, the computer program code comprising: first applying code configured to cause the at least one processor to receive information regarding a current data block of an image; second applying code configured to cause the at least one processor to determine whether Local Illumination Compensation (LIC) is applicable for the current data block, wherein the determining of whether LIC is applicable for the current block includes determining whether the current data block is coded with affine inter prediction; third applying code configured to cause the at least one processor to, based on determining that the LIC is applicable for the current data block, at least one of: infer an LIC flag for the current data block to be 1 or true corresponding to the LIC being enabled, or inherit the current block's LIC flag from an LIC flag of a neighboring block; and fourth applying code configured to cause the at least one processor to, based on the LIC flag for the current data block corresponding to the LIC being enabled, generate a prediction of at least one sub-block with a derived motion vector by applying LIC to the current data block using the inherited LIC flag.

According to an embodiment, a non-transitory computer-readable storage medium may store instructions that cause one or more processors to: receive information regarding a current data block of an image; determine whether Local Illumination Compensation (LIC) is applicable for the current data block, wherein the determining of whether LIC is applicable for the current block includes determining whether the current data block is coded with affine inter prediction; based on determining that the LIC is applicable for the current data block, at least one of: infer an LIC flag for the current data block to be 1 or true corresponding to the LIC being enabled, or inherit the current block's LIC flag from an LIC flag of a neighboring block; and based on the LIC flag for the current data block corresponding to the LIC being enabled, generate a prediction of at least one sub-block with a derived motion vector by applying LIC to the current data block using the inherited LIC flag.

The techniques for encoding/decoding can be implemented by one or more processors that may execute computer software having computer-readable instructions that may be physically stored in one or more computer-readable media (e.g., a hard disk drive). For example, FIG. 15 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 15 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove 704, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 704, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" or "computer readable medium" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 7046. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method comprising:
receiving information regarding a current data block of an image;
determining whether Local Illumination Compensation (LIC) is applicable for the current data block, wherein the determining of whether LIC is applicable for the current block includes determining whether the current data block is coded with affine inter prediction;
based on determining that the LIC is applicable for the current data block, at least one of: infering an LIC flag for the current data block to be 1 or true corresponding to the LIC being enabled, or inheriting the current block's LIC flag from an LIC flag of a neighboring block; and
based on the LIC flag for the current data block corresponding to the LIC being enabled, generating a prediction of at least one sub-block with a derived motion vector by applying LIC to the current data block using the inherited LIC flag.

2. The method of claim 1, wherein the determining of whether the LIC is applicable for the current data block includes:
determining whether the current data block is coded with affine inter prediction or regular inter prediction; and
based on determining that the current block is coded with affine inter prediction:
determining whether any other LIC resrictions apply; and
based on determining that no other LIC restrictions apply, infer that the LIC is enabled.

3. The method of claim 2, wherein the applying of the LIC to the current data block includes, if the current block is using a constructed affine merge mode, inheriting the current block's LIC flag from the LIC flag of the neighboring block.

4. The method of claim 1, wherein the neighboring block is used to predict a control point motion vector of a corner of the current data block.

5. The method of claim 4, wherein the predicted control point motion vector of the corner of the current data block is a predicted control point motion vector of a top-left corner of the current data block.

6. The method of claim 1, wherein applying the LIC to the current data block includes: applying LIC for an affine data block based on a linear model for illumination changes, using a scaling factor and an offset based on the derived motion vector, and, for each prediction direction, deriving the scaling factor and the offset by using at least one neighbouring sample of the current block and at least one corresponding reference sample.

7. The method of claim 6, wherein the at least one neighboring sample includes subsampled neighbouring samples of the current block and corresponding reference samples identified by motion information of the current block in a reference picture.

8. The method of claim 1, further comprising:
when the current data block is coded with merge mode, copying the LIC flag from neighbouring blocks, in a way similar to motion information copied in the merge mode; and
when the current data block is not coded with merge mode, the LIC flag is signalled for the current data block to indicate whether LIC applies or not.

9. The method of claim 1, wherein the applying of the LIC includes using a mean-removed sum of absolute difference (MR-SAD) and a mean-removed sum of absolute Hadamard-transformed difference (MR-SATD) instead of SAD and SATD, for integer pel motion search and fractional pel motion search, respectively.

10. The method of claim 1, wherein the applying of the LIC includes uni-directional illumination compensation, and in local illumination compensation, the scaling factor and offset are derived and the LIC is applied on a CU basis.

11. The method of claim 2, wherein the other restrictions include: a sub-block based on TMVP, triangular partition, multi hypothesis intra inter and bi-directional prediction, or bi-directional prediction.

12. The method of claim 2, wherein the other restrictions include: when one or more of the following conditions apply:
   (A) when the number of samples in the current block is below a certain minimum threshold;
   (B) when the number of samples in the current block is above a certain maximum threshold;
   (C) when the number of samples on either side of the current block is below a side minimum threshold; or
   (D) when the number of samples in either side of the current block is above a certain maximum threshold.

13. The method of claim 12, wherein the certain minimum threshold, certain maximum threshold, the certain side minimum threshold and the certain maximum threshold vary based on whether the current data block is an affine inter prediction data block.

14. The method of claim 12, wherein at least one of: the minimum threshold is set to 64 luma samples, the maximum threshold is set to 4096 luma samples, the side minimum threshold is set to 8 luma samples, or the side maximum threshold is set to 64 luma samples.

15. The method of claim 2, wherein the other restrictions include at least one of: an LIC flag is not stored in the motion vector buffer of the reference picture, or a bi-directional merge candidate, a par-wise average candidate, or a zero motion candidate is used.

16. The method of claim 1, further comprising:
   when the current data block is coded with affine inter prediction affine merge mode, determining the LIC flag value for the current data block by inheriting the LIC flag of a neighboring block that is used as a source of affine model inheritance, which is signalled in the bitstream to indicate whether affine AMVP mode is used, and another flag signals to indicate whether 4-parameter affine or 6-parameter affine is used, and
   use a first equation when 4-parameter affine is used, and
   use a second equation when 6-parameter affine is used.

17. The method of claim 1, wherein the inferred LIC flag is enabled for either affine AMVP mode or AMVP mode for regular inter prediction, but not for both.

18. The method of claim 1, further comprising:
   applying affine merge mode for CUs with both width and height larger than or equal to a threshold, and selecting only a first inherited candidate from each side, and
   when a neighboring affine CU is identified, control point motion vectors of the neighboring affine CU are used to derive the CPMVP candidate in the affine merge list of the current CU.

19. An apparatus comprising:
   at least one memory configured to store computer program code; and
   at least one processor configured to access the at least one memory and operate according to the computer program code, the computer program code comprising:
      first applying code configured to cause the at least one processor to receive information regarding a current data block of an image;
      second applying code configured to cause the at least one processor to determine whether Local Illumination Compensation (LIC) is applicable for the current data block, wherein the determining of whether LIC is applicable for the current block includes determining whether the current data block is coded with affine inter prediction;
      third applying code configured to cause the at least one processor to, based on determining that the LIC is applicable for the current data block, at least one of: infer an LIC flag for the current data block to be 1 or true corresponding to the LIC being enabled, or inherit the current block's LIC flag from an LIC flag of a neighboring block; and
      fourth applying code configured to cause the at least one processor to, based on the LIC flag for the current data block corresponding to the LIC being enabled, generate a prediction of at least one sub-block with a derived motion vector by applying LIC to the current data block using the inherited LIC flag.

20. A non-transitory computer-readable storage medium storing instructions that cause one or more processors to:
   receive information regarding a current data block of an image;
   determine whether Local Illumination Compensation (LIC) is applicable for the current data block, wherein the determining of whether LIC is applicable for the current block includes determining whether the current data block is coded with affine inter prediction;
   based on determining that the LIC is applicable for the current data block, at least one of: infer an LIC flag for the current data block to be 1 or true corresponding to the LIC being enabled, or inherit the current block's LIC flag from an LIC flag of a neighboring block; and
   based on the LIC flag for the current data block corresponding to the LIC being enabled, generate a prediction of at least one sub-block with a derived motion vector by applying LIC to the current data block using the inherited LIC flag.

* * * * *